July 25, 1950
H. BAUER
2,516,362
SAFETY SWITCH
Filed March 18, 1946
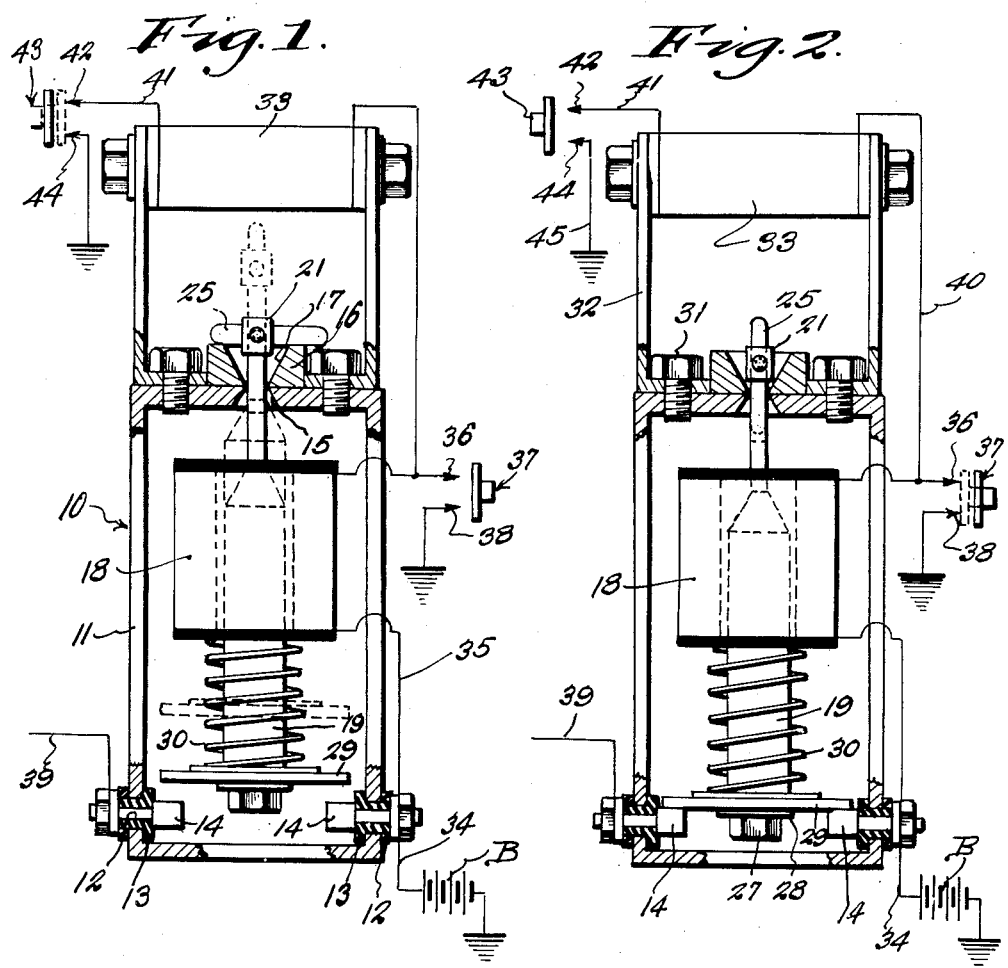
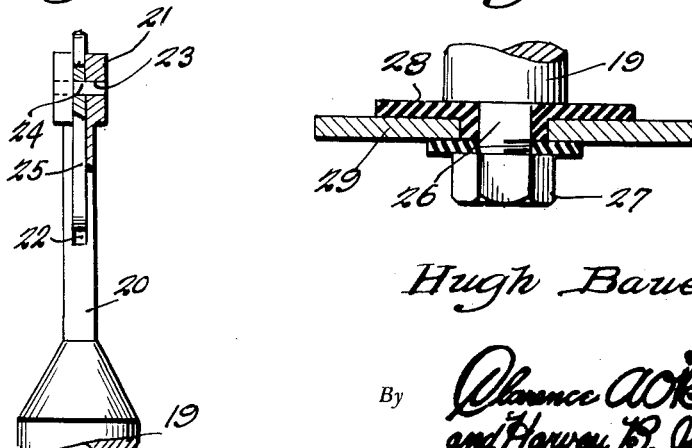
Inventor
Hugh Bauer
By Clarence A. O'Brien
and Harvey B. Jacobson
Attorneys Patented July 25, 1950

2,516,362

UNITED STATES PATENT OFFICE 2,516,362

SAFETY SWITCH

Hugh Bauer, Brooklyn, N. Y.

Application March 18, 1946, Serial No. 655,247

5 Claims. (Cl. 175—375)

1

This invention relates to a safety switch and more particularly to a master switch for disconnecting and connecting a storage battery of a motor vehicle with the electrical system of such a vehicle.

The primary object of the invention is to isolate the battery current from all wiring to which it normally flows when the vehicle is in operation.

Another object is to protect mechanics or others when they are working on the vehicle or parts thereof from injury due to fires caused by sparks such as frequently occur when the electrical system is short-circuited through contact with screw drivers and like tools.

A further object is to prevent accidental discharge of the storage battery and the resultant injury thereto.

The above and other objects may be attained by employing this invention which embodies among its features mounting between the storage battery and the wiring system of a motor vehicle, boat or similar pieces of equipment, a master switch by which when the vehicle or the like is out of service the battery may be readily disconnected from the wiring system and yet such connection may be easily momentarily reestablished when it is desired to place the vehicle or the like in service.

Other features include a master switch comprising spaced main contacts, a bridging contact yieldingly urged into engagement with the spaced main contacts, a solenoid for moving the bridging contact away from the main contacts, electro-magnetically controlled latch means for holding the bridging contact out of engagement with the main contacts and push button means selectively to energize the solenoid alone, or the solenoid and electro-magnetically controlled latch whereby the movements of the bridging contact may be governed.

In the drawings:

Figure 1 is a side view partially in section illustrating a master switch embodying the features of this invention, and showing the bridging contact out of engagement with the main contacts, Figure 2 is a view similar to Figure 1 illustrating the bridging contact establishing communication between the main contacts, Figure 3 is a fragmentary side view of the solenoid stem showing the electro-magnetically controlled latch in its released position, and Figure 4 is a fragmentary enlarged sectional view through the opposite end of the solenoid

2 core showing the bridging contact in section thereon.

Referring to the drawings in detail, my improved master switch designated generally 10 comprises a frame 11 formed of side and end members and provided at suitably spaced points adjacent the lower ends of the side members 11 are apertures 12 for the reception of insulating bushings 13 in which main contacts 14 are sustained. Formed in the end member of the frame 11 opposite that near which the openings 12 are formed is an axial opening 15 which is surrounded by an upwardly extending collar 16 formed with a funnel shaped opening 17, the lower end of which aligns with the opening 15 as will be readily understood upon reference to the drawings.

Mounted in the frame 10 in any suitable manner is a solenoid 18 the armature 19 of which is provided with a stem or extension 20 of reduced cross section so as to be received in the openings 15 and 17 as will be readily understood upon reference to the drawings. The upper end of the extension 20 is provided with a head 21 and opening through the head and down into the stem or extension is a slot 22. Formed in the head 21 is an opening 23 for the reception of a pivot pin 24 by means of which a latch member 25 is pivotally mounted in the slot 22. As shown, the latch member 25 is so pivoted in the slot that its longer end will fall by gravity into the slot into the position illustrated in Figures 2 and 3. Formed at the lower end of the solenoid armature 19 is a cylindrical projection 26 which is externally screw threaded to receive a nut 27 and clamped between the shoulder formed between the main body of the armature and the cylindrical extension is an insulating bushing 28 upon which a bridging contact 29 is supported. This bridging contact is of sufficient size to engage the main contacts 14 when the solenoid armature 19 is in its lowermost position as illustrated in Figure 2. A compression coil spring 30 surrounds the solenoid armature 19 and the lower end thereof bears upon the bushing 28 while the upper end engages the underside of the solenoid 18 so that the contact 29 will be yieldingly held against the contacts 14 when the switch is in such position as to establish the flow of power from the storage battery or accumulator of the vehicle or boat to the electrical system thereof.

Secured as by cap screws 31 to the upper cross member of the frame 11 is a substantially U-shaped frame 32 the bight portion of which rests on the upper member of the frame 11 with the legs projecting upwardly. An electro-magnet 33 is mounted between the legs of the U-shaped frame 32 adjacent their upper ends and in such position that the latch member 25 is within the zone of influence of this magnet when the solenoid armature 19 is elevated as suggested by the dotted lines in Figure 1.

Connected to the storage battery B of a conventional motor vehicle or boat is a conductor 34 which leads to one of the contacts 14 and connected to this contact through a suitable conductor 35 is one terminal of the coil of the solenoid 18. The opposite terminal of said solenoid coil is connected to a contact 36 of a push button designated generally 37 the opposite contact 38 of which is connected to ground. It is to be understood that the terminal of the battery opposite that connected to the conductor 34 is also grounded and it will thus be seen that when the push button 37 is actuated to bridge the contacts 36 and 38 as suggested by the dotted lines in Figure 2, the solenoid 18 will be energized thus causing the armature 19 thereof to move into the dotted line position illustrated in Figure 1. In this position in the absence of any other force, the latch member 25 will fall by gravity into the slot 22 so that upon releasing the push button 37 the solenoid core 19 will descend into the position shown in Figure 2 under the influence of the spring 30 and also of gravity so as to establish bridging contact of the contact 29 with the contacts 14. It will be understood that the conductor 39 leading from the contact 14 opposite that to which the conductor 34 is connected is adapted to be connected to the electrical system of the vehicle or boat as the case may be.

Connected in electrical communication with the contact 36 of the push button 37 is a conductor 40 which leads to one terminal of the coil of the electro-magnet 33, the opposite terminal of which is connected through the medium of a conductor 41 to a contact 42 of a push button designated generally 43. The opposite contact 44 of the push button is connected to ground in any suitable manner as by through conductor 45 and it will thus be seen that when the push button 43 is manipulated as suggested in the dotted line position in Figure 1, both the solenoid 18 and the electro-magnet 33 will be energized. Such energization of the solenoid 18 will move the latch 25 into the zone of influence of the electro-magnet 33 so that when the latter is energized as by operation of the push button 43 the latch 25 will be swung about its pivot 24 into a horizontal position as shown in Figure 1. Having moved the latch into this position, upon release of pressure on the push button 43 the armature 19 of the solenoid, descending under the influence of gravity and of spring 30 will move with such rapidity that the latch will not have time to fall back into the slot 22 with the result that it will engage the upper end of the collar 18 which serves as a limit stop to prevent the descent of the bridging contact 29 into engagement with the contacts 14 and hence the circuit between the battery and the wiring system of the vehicle or boat will be interrupted. In this way, various operations on the mechanism may be performed without danger of short circuiting the wiring system and without danger of drainage of the current from the battery. By simply pressing the push button 37, the contact between the contacts 14 may be re-established so as to again connect the wiring system of the vehicle with the battery for normal operation.

From the foregoing it will be obvious that by the simply pressing of one or the other of the push buttons, the battery may be isolated from the electrical circuit of a vehicle or connection therewith may be re-established and consequently discharge of the battery through accident may be readily avoided.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. An electrical device comprising a pair of spaced contacts, a bridging contact adapted to selectively close a circuit between said spaced contacts, means yieldingly urging said bridging contact into engagement with said spaced contacts, a solenoid including an armature carrying said bridging contact, an extension on said armature, a stop plate having an aperture therein through which said extension projects, a gravity actuated latch of magnetically responsive material selectively engaging said stop plate and holding said bridging contact out of engagement with said spaced contacts, said latch being pivotally secured to said extension on said armature, and electromagnetic means operatively secured adjacent said latch selectively moving said latch against the force of gravity.

2. An electrical device comprising a pair of spaced contacts, a bridging contact adapted to selectively close a circuit between said spaced contacts, means yieldingly urging said bridging contact into engagement with said spaced contacts, a solenoid including an armature carrying said bridging contact, an extension on said armature, a stop plate having an aperture therein through which said extension projects, a gravity actuated latch of magnetically responsive material selectively engaging said stop plate and holding said bridging contact out of engagement with said spaced contacts, said latch being pivotally secured to said extension on said armature, electromagnetic means operatively secured adjacent said latch selectively moving said latch against the force of gravity, and switch means selectively energizing said solenoid singly and selectively energizing both said solenoid and said electromagnetic means simultaneously.

3. An electrical device comprising a pair of spaced contacts, a bridging contact adapted to selectively close a circuit between said spaced contacts, a solenoid including an armature carrying said bridging contact means biasing said bridging contact and said solenoid yieldingly urging said bridging contact into engagement with said spaced contacts, a solenoid including an armature carrying said bridging contact, an extension on said armature, a stop plate having an aperture therein through which said extension projects, a latch selectively engaging said stop plate and holding said bridging contact out of engagement with said spaced contacts pivotally secured to said extension, and electromagnetic means operatively secured adjacent said latch selectively moving said latch against the force of gravity.

4. An electrical device comprising a pair of spaced contacts, a bridging contact adapted to selectively close a circuit between said spaced contacts, a solenoid including an armature carrying said bridging contact means biasing said bridging contact and said solenoid yieldingly urging said bridging contact into engagement with said spaced contacts, a solenoid including an armature carrying said bridging contact, an extension on said armature, a stop plate having an aperture therein through which said extension projects, a latch selectively engaging said stop plate and holding said bridging contact out of engagement with said spaced contacts pivotally secured to said extension, electromagnetic means operatively secured adjacent said latch selectively moving said latch against the force of gravity, and switch means selectively energizing said solenoid singly and selectively energizing both said solenoid and said electromagnetic means simultaneously.

5. An electrical device comprising a frame, spaced contacts on said frame, a solenoid including an armature, a bridging contact on said armature selectively engaging said spaced contacts, resilient means biasing said bridging contact and said solenoid, a stop plate secured to said frame having an aperture therethrough, an extension on said armature, said extension extending through said aperture, a latch pivotally secured to said extension selectively engaging said stop plate, and electromagnetic means operatively secured to said frame adjacent said latch selectively actuating said latch.

HUGH BAUER.

REFERENCES CITED

The following references are of record in the file of this patent:

UNITED STATES PATENTS

| Number | Name | Date |
|---|---|---|
| 746,490 | Garrett | Dec. 8, 1903 |
| 830,209 | Conkling et al. | Sept. 4, 1906 |
| 906,056 | McGary | Dec. 8, 1908 |
| 1,428,727 | Wassman et al. | Sept. 12, 1922 |
| 1,564,815 | Ballance et al. | Dec. 8, 1925 |
| 1,654,511 | Galusha | Dec. 27, 1927 |
| 1,691,252 | Reisbach | Nov. 13, 1928 |
| 1,981,681 | True | Nov. 20, 1934 |
| 1,995,780 | Phillips | Mar. 26, 1935 |
| 2,197,715 | Sekella | Apr. 16, 1940 |
| 2,244,065 | Hughes | June 3, 1941 |

FOREIGN PATENTS

| Number | Country | Date |
|---|---|---|
| 320,861 | Germany | May 8, 1920 |
| 346,304 | Germany | Dec. 29, 1921 |